United States Patent [19]

Murakami

[11] Patent Number: 4,519,361
[45] Date of Patent: May 28, 1985

[54] THROTTLE CONTROL SYSTEM FOR AUTOMOTIVE VEHICLE

[75] Inventor: Terukiyo Murakami, Yokosuka, Japan

[73] Assignee: Nissan Motor Company, Limited, Yokohama, Japan

[21] Appl. No.: 598,205

[22] Filed: Apr. 9, 1984

[30] Foreign Application Priority Data

Apr. 11, 1983 [JP] Japan ................... 58-63285

[51] Int. Cl.³ ............................................. F02D 9/00
[52] U.S. Cl. .................... 123/399; 123/361; 123/403
[58] Field of Search ............. 123/361, 395, 399, 403

[56] References Cited

U.S. PATENT DOCUMENTS

| 4,301,883 | 11/1981 | Collonia | 123/361 |
| 4,377,995 | 3/1983 | Fiala | 123/361 |
| 4,380,799 | 4/1983 | Allard et al. | 123/361 |
| 4,419,973 | 12/1983 | Collonia | 123/361 |
| 4,470,396 | 9/1984 | Hasumi et al. | 123/399 |

FOREIGN PATENT DOCUMENTS 51-138235  11/1976  Japan .
57-44750    3/1982  Japan .

Primary Examiner—William A. Cuchlinski, Jr.
Attorney, Agent, or Firm—Schwartz, Jeffery, Schwaab, Mack, Blumenthal & Evans

[57] ABSTRACT

In a throttle system including electrical elements or devices, if trouble occurs in these elements, there exists a problem in that the throttle valve is further driven forcibly in spite of the fact that the throttle valve has already been fully closed or opened or the throttle valve is kept open in spite of the fact that the accelerator pedal has already been fully released. To overcome the above problem, the actual throttle valve opening rate is corrected on the basis of the throttle valve fully-closed and fully-opened opening rates and in accordance with a proportion calculation.

5 Claims, 7 Drawing Figures 4,519,361

THROTTLE CONTROL SYSTEM FOR AUTOMOTIVE VEHICLE

BACKGROUND OF THE INVENTION

1. Field of the Invention

The present invention relates generally to a throttle control system for an automotive vehicle by which a throttle valve opening rate is controlled via electrical or pneumatic devices in response to accelerator pedal stroke, and more specifically to a throttle control system provided with fail-safe function.

2. Description of the Prior Art

In an automotive vehicle, when an accelerator pedal is depressed by the driver, a throttle valve disposed in a carburetor is opened to accelerate the vehicle. Conventionally, the relationship between the stroke of the accelerator pedal depressed by the driver and the opening rate of the throttle valve is fixedly predetermined in dependence upon the mechanical structure of the throttle device.

For instance, in the case of a single barrel throttle device, because the throttle valve opening rate is predetermined to be roughly linear in proportion to the accelerator pedal stroke, throttle valve opening rate increases relatively abruptly with increasing accelerator pedal stroke.

These accelerator pedal control characteristics are suitable for accelerating the vehicle quickly, for instance, to avert danger when the vehicle is travelling at a high speed on a highway. However, these are not suitable for repeatedly and finely driving the vehicle a little forward slowly when the vehicle is travelling at a low speed on a busy street. In contrast with this, in the case of a twin barrel throttle device, because the throttle valve opening rate is predetermined to be delayed according to the accelerator pedal stroke, throttle valve opening rate increases relatively gently with increasing accelerator pedal stroke. Therefore, the accelerator pedal control characteristics are suited for repeatedly and finely driving the vehicle a little forward slowly when the vehicle is travelling at a low speed on a busy street. However, these are not suitable for accelerating the vehicle quickly to avert danger when the vehicle is travelling at a high speed on a highway.

That is to say, in the conventional accelerator device, it is impossible to freely obtain appropriate accelerator pedal control characteristics indicative of relationship between throttle valve opening rate and accelerator pedal stroke according to driver's preference or vehicle travelling conditions.

In order to overcome the above-mentioned problems, the same inventer has proposed a novel accelerator pedal control system for an automotive vehicle such that any appropriate accelerator pedal control characteristics representative of relationship between throttle valve opening rate and accelerator pedal stroke can be selected freely by driver's preference according to vehicle travelling conditions, which has already been filed on Dec. 23, 1983 as U.S. Pat. application Ser. No. 564,682 or on Dec. 27, 1983 as EPC patent application No. 83113143.8.

In such a control system as described above, however, since there are arranged a number of electrical or pneumatic devices such as potentiometers, encoders, motors, switches, sensors, etc. between the accelerator pedal and the throttle valve, there exist problems in that the throttle valve is further driven forcibly in spite of the fact that the throttle valve has been fully closed or opened, or the throttle valve is kept open in spite of the fact that the accelerator pedal has fully been released, because these devices operate abnormally due to potentiometer looseness or aging, element failure, etc. When such trouble occurs, some elements of the system may be damaged or the vehicle may be accelerated even after the accelerator pedal has been released.

SUMMARY OF THE INVENTION

With these problems in mind, therefore, it is the primary object of the present invention to provide a throttle control system for an automotive vehicle in which fail-safe function is provided in order to improve system reliability. The above fail-safe function is to prevent the throttle valve from being further driven forcibly in spite of the fact that the throttle valve has been fully closed or opened and to prevent the throttle valve from being kept open in spite of the fact that the accelerator pedal has been fully released.

To achieve the above-mentioned object, the throttle control system for an automotive vehicle according to the present invention comprises an accelerator pedal, a throttle valve, means for detecting a stroke of the accelerator pedal, means for calculating a target throttle valve opening rate in response to the detected accelerator pedal stroke, means for detecting an actual throttle valve opening rate, means for detecting that the throttle valve is driven to its fully-closed position, means for detecting that the throttle valve is driven to its fully-open position, means for storing the actual throttle valve fully-closed position opening rate, means for storing the actual throttle valve fully-open position opening rate, means for correcting the actual throttle valve opening rate on the basis of the stored actual throttle valve fully-closed and fully-opened position opening rates, and means for driving the throttle valve in response to the target throttle valve opening rate and the corrected actual throttle valve opening rate.

BRIEF DESCRIPTION OF THE DRAWINGS

The features and advantages of the throttle control system for an automotive vehicle according to the present invention will be more clearly appreciated from the following description taken in conjunction with the accompanying drawings in which like reference numerals designate corresponding elements and in which:

FIG. 5 is a timing chart showing the times when the throttle close-limit switch and the throttle open-limit switch are turned on;

DETAILED DESCRIPTION OF THE PREFERRED EMBODIMENTS

Figure 1:
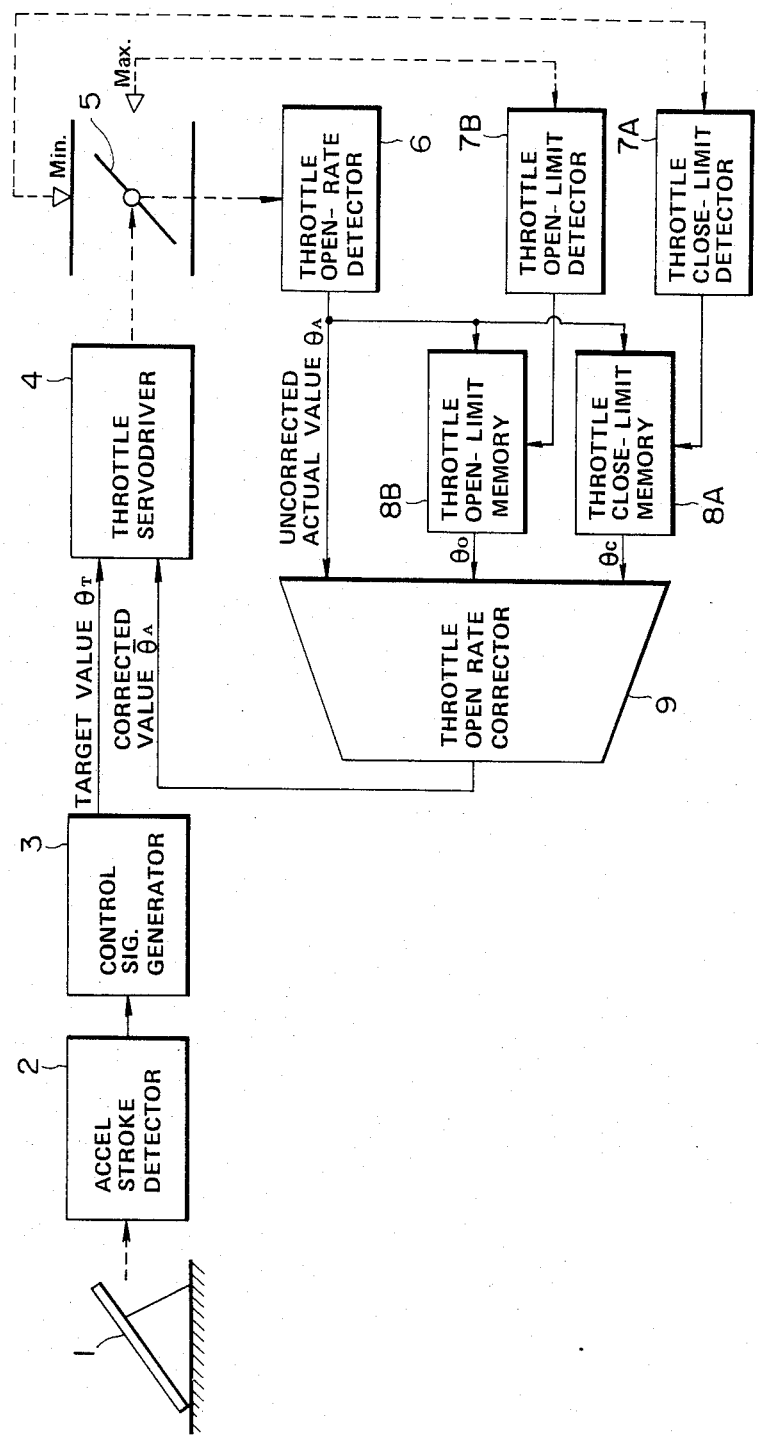
FIG. 1 is a schematic block diagram of a first embodiment of the throttle control system for an automotive vehicle according to the present invention.

In view of the above description, reference is now made to a first embodiment of the present invention. With reference to FIG. 1, the throttle control system of the present invention comprises an accelerator pedal 1, an accelerator pedal stroke detector 2, a control signal generator 3, a throttle servodriver 4, a throttle valve 5, a throttle open-rate detector 6, a throttle close-limit detector 7A, a throttle open-limit detector 7B, a throttle close-limit memory unit 8A, a throttle open-limit memory unit 8B, and a throttle opening-rate corrector 9.

The accelerator pedal stroke detector 2 detects the stroke of the accelerator pedal 1. The control signal generator 3 reads a stroke signal outputted from the accelerator pedal stroke detector 2, determines a target throttle valve opening rate by looking-up a table in which control characteristics representative of relationship between throttle valve opening rate and accelerator pedal stroke are listed and by executing necessary interpolation calculation, and outputs a target command signal to the throttle servodriver 4. The throttle servodriver 4 drives the throttle valve 5 in accordance with the target command signal $\theta_T$ outputted from the control signal generator 3 and a corrected feedback signal $\overline{\theta}_A$ representative of an actual corrected throttle valve opening rate (described later) so that the difference $(\theta_T - \overline{\theta}_A)$ can be reduced to zero.

The throttle open rate detector 6 detects the actual throttle opening rate and outputs an uncorrected feedback signal $\theta_A$ indicative of an actual throttle opening rate. The throttle close-limit switch 7A detects that the throttle 5 is driven to its fully-closed position and outputs a throttle fully-closed position signal. The throttle open-limit switch 7B detects that the throttle 5 is driven to its fully-open position and outputs a throttle fully-open position signal. The throttle close-limit memory 8A stores the actual fully-closed position throttle opening rate $\theta_C$ detected by the throttle open rate detector 6 in response to the throttle fully-closed position signal outputted by the throttle close-limit detector 7A. The throttle open-limit memory 8B stores the actual fully-open position throttle opening rate $\theta_O$ detected by the throttle open rate detector 6 in response to the throttle fully-open position signal outputted by the throttle open-limit detector 7B. The throttle open rate corrector 9 receives the three signals of the detected actual throttle valve opening rate $\theta_A$ outputted by the throttle open rate detector 6, the stored actual fully-closed position throttle opening rate $\theta_C$ read from the throttle close-limit memory 8A, and the stored actual fully-open position throttle opening rate $\theta_O$ read from the throttle open-limit memory 8B and corrects the actual opening rate $\theta_A$ in accordance with the following proportion calculation:

$$\overline{\theta}_A = {}^*\theta_O \times \frac{\theta_A - \theta_C}{\theta_O - \theta_C}$$

where $^*\theta_O$ denotes a predetermined reference throttle fully-open position opening rate. The corrected actual throttle valve opening rate $\overline{\theta}_A$ is outputted from the throttle open rate corrector 9 to the throttle servodriver 4.

As described above, in the throttle control system according to the present invention, since the fully-open and fully-closed position throttle opening rates $\theta_O$ and $\theta_C$ are updated whenever the throttle valve is driven to its two extream positions and the actual detected throttle opening rate is corrected on the basis of the two updated opening rates and in accordance with a proportion calculation, in case the two extream position opening rates detected by the throttle open-rate detector 6 vary according to trouble, failure, aging etc. of the system, it is possible to reliably drive the throttle valve 5.

Figure 2:
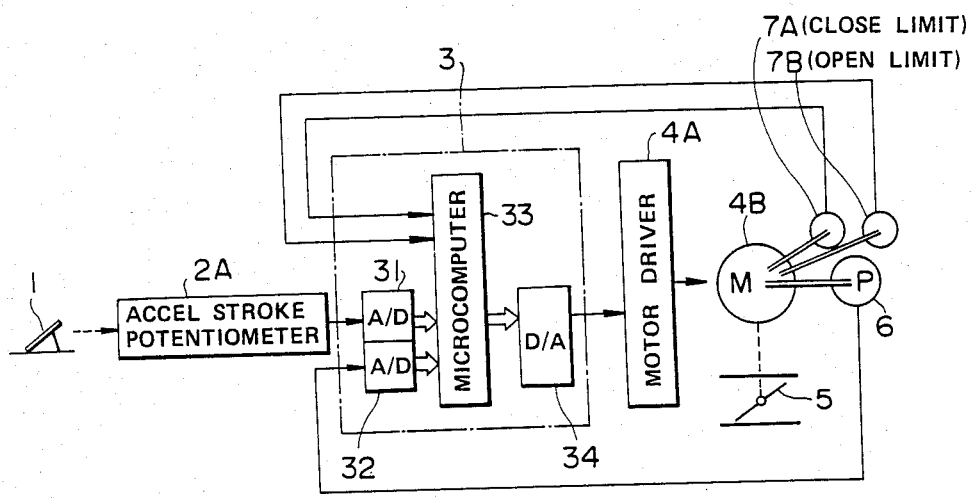
FIG. 2 is a schematic block diagram of a second embodiment of the throttle control system for an automotive vehicle according to the present invention.

FIG. 2 is a schematic block diagram of a second embodiment of the throttle control system according to the present invention. In FIG. 2, the system comprises an accelerator pedal stroke potentiometer 2A, a control signal generator 3 including analog-to-digital converters 31 and 32, a microcomputer 33 and a digital-to-analog converter 34, a motor driver 4A, a motor 4B, a throttle opening rate potentiometer 6, a throttle close-limit switch 7A, and a throttle open-limit switch 7B.

The accelerator pedal stroke potentiometer 2A outputs an analog signal the voltage level of which is proportional to the stroke of the accelerator pedal.

Figure 3:
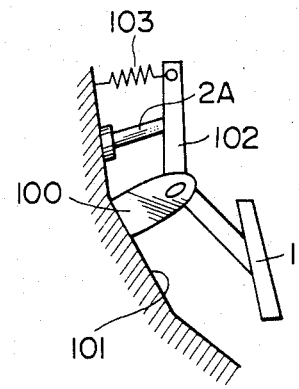
FIG. 3 is a pictorial illustration showing an exemplary structure for detecting accelerator pedal stroke used with the throttle control system according to the present invention.

FIG. 3 is a pictorial illustration showing an example of the structure of an accelerator pedal provided with the stroke potentiometer 2A. A bracket 100 is fixed at an appropriate position to the floor 101 of a vehicle body. The middle portion of a shallow-V-shaped pedal lever 102 is pivotably supported by the bracket 100. The accelerator pedal 1 is fixed to one end of the pedal lever 102. A return spring 103 is disposed between the floor 101 and the other end of the pedal lever 102. The pedal 1 is urged by this return spring 103 to its zero-stroke position when released. The accelerator pedal stroke potentiometer 2A is disposed between the floor 101 and the pedal lever 102. This potentiometer 2A of linear sliding-contact resistance type outputs analog voltage signals indicative of accelerator pedal stroke.

The control signal generator 3 receives the stroke signal from the accelerator stroke potentiometer 2A through the analog-to-digital converter 31, the feedback signal indicative of the actual throttle valve opening rate through the analog-to-digital converter 32, and two signals outputted by the throttle close-limit switch 7A and the throttle open-limit switch 7B. The microcomputer 33 determines a target throttle valve opening rate $\theta_T$ according to the detected actual accelerator pedal stroke in accordance with table look-up method and interpolation calculation, corrects the detected actual feedback signal (throttle valve potentiometer signal) supplied from the throttle opening rate potentiometer 6 on the basis of the updated throttle fully-closed and fully-open position opening rates and proportion calculation, calculates the difference between the target value $\theta_T$ and the actual corrected value $\overline{\theta}_A$, and outputs a command signal through the digital-to-analog converter 34.

The motor driver 4A receives the target command signal $(\theta_T - \overline{\theta}_A)$ from the control signal generator 3, and drives the motor 4B in the direction that the difference $(\theta_T - \overline{\theta}_A)$ between the two signals is reduced to zero. The throttle close-limit and open-limit switches 7A and 7B are turned on when the throttle valve 5 is positioned at its fully-closed and -open positions, respectively.

Figure 4:
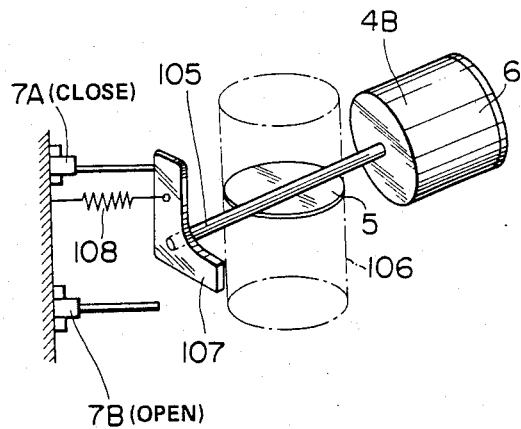
FIG. 4 is a pictorial illustration showing an exemplary structure for detecting throttle valve opening rate used with the throttle control system according to the present invention.
Figure 5:
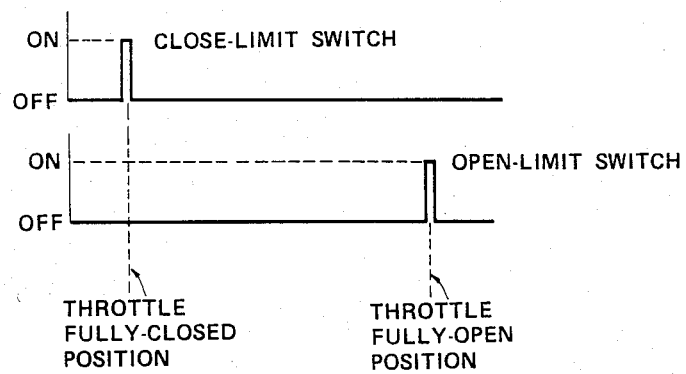

FIG. 4 is a pictorial illustration showing an example of the structure of a throttle valve provided with the throttle limit switches 7A and 7B and the throttle potentiometer 6. The throttle valve 5 is fixed to a throttle shaft 105 pivotably supported at an appropriate position to an intake air conduit 106. The shaft 105 is directly connected to a driven shaft of the motor 4B. At the end of the throttle shaft 105, an L-shaped lever 107 is fixed. A return spring 108 is disposed to urge the throttle valve 5 to its initial position. The throttle close-limit switch 7A is disposed at such a position as to be turned on when the throttle valve is returned to its initial position, as depicted in FIG. 5. The throttle open-limit switch 7B is disposed at such a position as to be turned on when the throttle valve is shifted to its extream open position, as also depicted in FIG. 5. The throttle potentiometer 6 is attached on the flat end of the motor 4B. This potentiometer 6 is of rotary sliding-contact resistance type. The potentiometer 6 includes a rotatable sliding contact coupled with the driven shaft 105 of the motor 4B and a circular resistance on which the sliding contact slides. Therefore, when the motor 4B rotates through an angle, since the sliding contact also slides on and along the circular resistance together with the throttle valve 5, the potentiometer 6 outputs an analog signal the voltage level of which is proportional to the angular stroke of the throttle valve 5. Further, since the lever 107 is urged by the return spring 108 in the direction that the throttle valve is closed, when current is not supplied to the motor 4B, the throttle valve 5 is fully closed by the force of the return spring 108.

In the second embodiment shown in FIG. 2, the throttle valve opening rates are represented by voltages detected by the throttle valve potentiometer 6.

Figure 6:
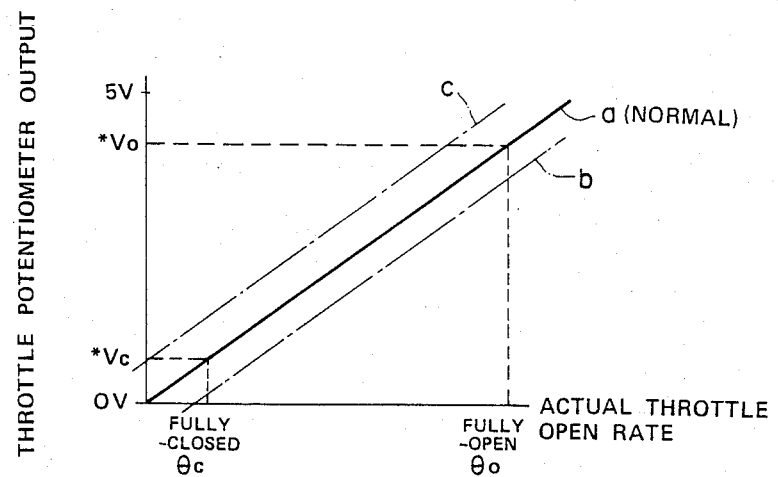
FIG. 6 is a graphical representation showing an example of the relationship between the output voltage of the throttle valve potentiometer and the actual throttle valve opening rate, in which the solid line a represents a normal state and the dotted and dashed lines b and c represent an abnormal state.

FIG. 6 shows the relationship between the throttle valve opening rate (abscissa) and the throttle valve potentiometer output voltage (ordinate). In the normal state, the throttle valve potentiometer 6 is so predetermined as follows: when the throttle valve is fully closed ($\theta_C$), a reference voltage of *$V_C$ is outputted; when fully opened ($\theta_O$), a reference voltage of *$V_O$ is outputted; as depicted by the solid line a in FIG. 6. However, once the potentiometer 6 goes into an abnormal state due to looseness, aging, etc., the relationship between the throttle valve opening-rate and the potentiometer output voltage is shifted to either side of the line a, as depicted by the dotted and dashed lines b and c in FIG. 6.

In the case where the throttle potentiometer output is shifted lower than the normal line a, as shown by the line b in FIG. 6, the system operates abnormally as follows: when a command signal to close the throttle valve to its fully-close position is outputted, since the throttle potentiometer 6 cannot output a voltage *$V_C$ but a voltage $V_C$ lower than *$V_C$, the difference $\Delta V = $*$V_C - V_C$ is held at a positive value in spite of the fact that the throttle valve 5 is fully closed, so that the throttle valve is kept open beyond its extream close position. When a command signal to open the throttle valve to its fully-open position is outputted, since the throttle potentiometer 6 cannot output a voltage *$V_O$ but a voltage $V_O$ lower than *$V_O$, the difference $\Delta V = $*$V_O - V_O$ is also held at a positive value in spite of the fact that the throttle valve 5 is fully opened, so that the throttle valve is further driven forcibly beyond its extream open position.

In the case where the throttle potentiometer output is shifted higher than the normal line a, as shown by the line c in FIG. 6, the system operates abnormally as follows: when a command signal to close the throttle valve to its fully-closed position is outputted, since the throttle potentiometer cannot output a voltage *$V_C$ but a voltage $V_C$ higher than *$V_C$, the difference $\Delta V = $*$V_C - V_C$ is held at a negative value in spite of the fact that the throttle valve 5 is fully closed, so that the throttle valve is further driven forcibly beyond its extream closed position. When a command signal to open the throttle valve to its fully-open position is outputted, since the throttle potentiometer 6 cannot output a voltage *$V_O$ but a voltage $V_O$ higher than *$V_O$, the difference $\Delta V = $*$V_O - V_O$ is also held at a negative value in spite of the fact that the throttle valve is fully opened, so that the throttle valve is kept ahead of its extream open position. The object of this invention is to overcome the above-mentioned problems by repeatedly updating the reference throttle potentiometer fully-closed $V_C$ or fully-opened voltage $V_O$ whenever the throttle valve is fully closed or opened.

Figure 7:
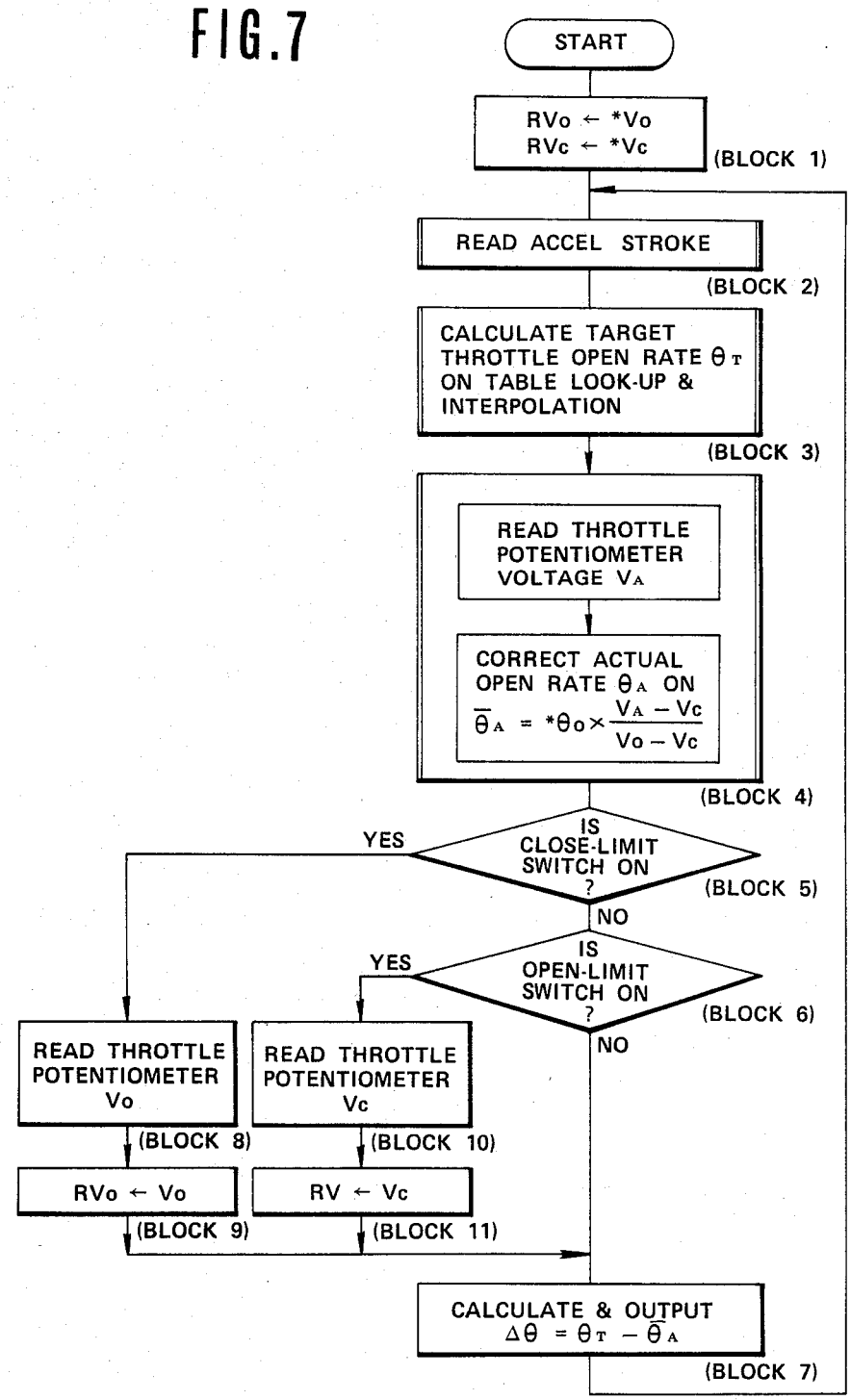
FIG. 7 is a program control flowchart showing the control steps of the throttle control system according to the present invention.

FIG. 7 is a flowchart of an example of control program used for the microcomputer 33. With reference to FIG. 7, the operation of the second embodiment of the present invention will be described hereinbelow. First, control transfers a predetermined reference closed-position voltage *$V_C$ stored in read-only memory (not shown) of the microcomputer 33 to a closed-position voltage registor $RV_C$ (not shown) of the microcomputer 33, and a predetermined reference open-position voltage *$V_O$ stored in the read-only memory to an open-position voltage registor $RV_O$ for initialization (in block 1). The above reference voltage *$V_C$ is a potentiometer output voltage obtained when the throttle valve is at its fully-closed position under the conditions that the throttle potentiometer 6 operates normally as depicted by the solid line a in FIG. 6. The above reference voltage *Vo is a potentiometer output voltage obtained when the throttle valve is at its fully-open position under the conditions that the throttle potentiometer 6 operates normally as depicted by the solid line a in FIG. 6. Further, the throttle fully-closed position indicates that the throttle valve is completely closed or closed to an idling position. Control reads the accelerator pedal stroke data outputted from the accelerator pedal stroke potentiometer 2A via the analog-to-digital converter 31 (in block 2). In response to the read pedal stroke data, control looks up a previously-stored table and performs a required interpolation calculation in order to obtain a target throttle valve opening rate $\theta_T$ corresponding to the read accelerator pedal stroke (in block 3). Then, control reads a voltage $V_A$ indicative of an actual or feedbacked throttle valve opening rate $\theta_A$ and outputted from the throttle valve potentiometer 6 via the analog-to-digital converter 32 and corrects the actual throttle valve opening rate $\theta_A$ in accordance with the following proportion calculation:

$$\bar{\theta}_A = {}^*\theta_O \times \frac{V_A - {}^*V_O}{{}^*V_O - {}^*V_C}$$

where *$\theta_O$ denotes a predetermined and designed opening rate obtained when the throttle valve is at its fully-open position (in block 4). Further, the double vertical lines enclosing the blocks 3 and 4 indicate a subroutine or an independent program, respectively.

Control determines whether the throttle close-limit switch 7A is on or not (in block 5) and whether the throttle open-limit switch 7B is on or not (in block 6). In the case where the throttle valve is not yet fully closed or opened, since the results of blocks 5 and 6 are "No", control advances to the succeeding step to calculate the difference $\Delta\theta(=\theta_T-\overline{\theta}_A)$ in throttle valve opening rate between the target value $\theta_T$ and the actual corrected value $\overline{\theta}_A$ and outputs the difference command signal $\Delta\theta$ to the motor driver 4A (in block 7). In response to this command signal, the motor driver 4A rotates the motor 4B in either direction so that the calculated difference command signal is reduced to zero. When the actual throttle valve opening rate $\overline{\theta}_A$ matches the target throttle valve opening rate $\theta_T$, since the motor driver 4A outputs no signal, the motor 4B stops rotating and thus the throttle valve 5 is kept at its balanced position. As long as the throttle valve 5 is not fully opened or closed, the above-mentioned steps from blocks 2, 3, 4, 5, 6, 7 and 2 are executed repeatedly. Further, in the control cycle as described above, since the reference voltages *$V_O$ and *$V_C$ are used for correcting the actually detected open rate $\theta_A$, it should be noted that the corrected value $\overline{\theta}_A$ should match the actual value $\theta_A$, as explained with reference to the solid line a in FIG. 6.

In contrast with the above, while the above steps from block 2 to block 7 are repeated, when the throttle valve is fully closed or opened and therefore the throttle close-limit switch 7A or the throttle open-limit switch 7B is turned on, "YES" is determined in block 5 or 6. Therefore, an actual throttle open-position or close-position voltage $V_O$ or $V_C$ developed across the throttle valve potentiometer 6 is read (in block 8 or 10) and then transferred to the closed-position voltage regristor $RV_C$ or the open-position voltage registor $RV_O$ (in block 9 or 10), instead of the reference throttle open-position or close-position voltage *$V_C$ or *$V_O$. Accordingly, thereafter the correction is executed (in block 4) in accordance with the following proportion calculation:

$$\overline{\theta}_A = {}^*\theta_O \times \frac{V_A - V_C}{V_O - V_C}$$

The above close-position or open-position voltage $V_O$ or $V_C$ is updated whenever the throttle valve is fully closed or opened.

In the above description, the proportion calculation is adopted for correcting the actual throttle valve opening rate, however, without being limited to this calculation, it is of course possible to adopt any appropriate calculation according to the throttle potentiometer input-output characteristics. Further, it is possible to prepare a table corresponding to the throttle potentiometer characteristics and to shift the table values according to the actual throttle valve closed-position or open-position value $V_C$ or $V_O$.

Further, in the embodiments described above, a single look-up table representative of the relationship between the accelerator pedal stroke and the target throttle valve opening rate is provided for the control signal generator or the microcomputer. However, it is of course possible to prepare a several kinds of look-up tables and to select an appropriate table according to the speed of accelerator pedal stroke or engine temperatures.

Further, in the above-mentioned embodiments, a resistance-type potentiometer is used as the accelerator pedal stroke potentiometer 2A or the throttle valve opening rate potentiometer 6. However, it is of course possible to use a pulse encoder of absolute type or increment type which can output encoded pulse signals representative of position, in place of the potentiometer. Furthermore, in the above-mentioned embodiments, a mechanical limit switch is used as the throttle close-limit switch 7A and the throttle open-limit switch 7B. However, it is of course possible to use other switches such as a slide switch having a movable contact and a fixed contact, a pressure sensitive switch, a magnetic sensitive switch, etc.

Further, in the above-mentioned embodiments, the motor 4B is used for driving the throttle valve 5. However, it is of course possible to use other hydraulic or pneumatic actuator.

As described above, in the throttle control system for an automotive vehicle by which the throttle valve is controlled, by means of electrical, hydraulic or pneumatic driving system, according to the accelerator pedal stroke, it is possible to prevent an abnormal state such that the throttle valve is further driven forcibly in spite of the fact that the throttle valve has already been closed or opened fully or the throttle valve is kept open in spite of the fact that the accelerator pedal has fully been released, because of failure or trouble occurred in the devices or elements incorporated within the system, thus improving the system reliability.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A throttle control system for an automotive vehicle, which comprises:
    (a) an accelerator pedal;
    (b) a throttle valve;
    (c) means for detecting a stroke of said accelerator pedal and outputting an accelerator pedal stroke signal;
    (d) means for calculating a target throttle valve opening rate in response to the detected accelerator pedal stroke signal and generating a target throttle valve opening rate control command signal corresponding thereto;
    (e) means for detecting an actual throttle valve opening rate and outputting an actual throttle valve opening rate signal corresponding thereto;
    (f) means for detecting that said throttle valve is driven to its fully-closed position and outputting a throttle valve close-position signal corresponding thereto;
    (g) means for detecting that said throttle valve is driven to its fully-open position and outputting a throttle valve open-position signal corresponding thereto;
    (h) means for storing the actual throttle valve fully-closed position opening rate in response to the throttle valve close-position signal;
    (i) means for storing the actual throttle valve fully-open position opening rate in response to the throttle valve open-position signal;
    (j) means for correcting the actual throttle valve opening rate on the basis of the stored actual throttle valve fully-closed and fully-opened position opening rates and outputting a corrected throttle valve opening rate; and (k) means for driving said throttle valve in response to the target throttle valve opening rate control command signal and the corrected actual throttle valve opening rate signal.

2. A throttle control system for an automotive vehicle, which comprises:

(a) an accelerator pedal;

(b) a throttle valve;

(c) an accelerator pedal stroke potentiometer for outputting a pedal stroke signal;

(d) a throttle valve potentiometer for outputting an actual throttle valve opening rate signal $\theta_A$;

(e) a throttle valve close-limit switch for outputting a throttle valve fully-closed position signal;

(f) a throttle valve open-limit switch for outputting a throttle valve fully-opened position signal;

(g) a microcomputer responsive to said accelerator pedal stroke potentiometer, said throttle valve potentiometer, said throttle valve close-limit switch and said throttle valve open-limit switch, said microcomputer determining a target throttle valve opening rate $\theta_T$ according to the detected accelerator pedal stroke signal in accordance with table look-up method and interpolation calculation, storing the actual throttle valve fully-closed position opening rate in response to the throttle valve fully-closed position signal and the actual throttle valve fully-opened position opening rate in response to the throttle valve fully-opened position signal, correcting the actual throttle valve opening rate on the basis of the stored actual throttle valve fully-closed and fully-opened opening rates and in accordance with a predetermined calculation expression, calculating the difference between the target opening rate and the corrected actual opening rate, and outputting a throttle valve opening rate control command signal; and (h) an actuator for driving said throttle valve to a target opening rate in response to the throttle valve opening rate control signal outputted from said microcomputer.

3. A method of controlling a throttle for an automotive vehicle, which comprises the following steps of:

(a) detecting and storing an actual throttle valve closed-position opening rate when a throttle valve is fully closed;

(b) detecting and storing an actual throttle valve opened-position opening rate when the throttle valve is fully opened;

(c) detecting accelerator pedal stroke;

(d) determining a target throttle valve opening rate according to the detected accelerator pedal stroke;

(e) detecting an actual throttle valve opening rate;

(f) correcting the actual throttle valve opening rate on the basis of the stored throttle valve fully-closed and fully-opened position opening rates;

(g) calculating the difference between the target throttle valve opening rate and the corrected throttle valve opening rate; and (h) setting the actual throttle valve opening rate to the target throttle valve opening rate.

4. A method of controlling a throttle for an automotive as set forth in claim 3, which further comprises the step of storing a reference throttle valve closed-position opening rate and a reference throttle valve opened-position opening rate for initialization.

5. A method of controlling a throttle for an automotive as set forth in claim 3, wherein in the step (f), the actual throttle valve opening rate is corrected in accordance with a proportion calculation.

* * * * *